United States Patent
Lee

(10) Patent No.: US 9,425,831 B1
(45) Date of Patent: Aug. 23, 2016

(54) ELECTRONIC DEVICE

(71) Applicant: GETAC TECHNOLOGY CORPORATION, Hsinchu County (TW)

(72) Inventor: Yen-Ching Lee, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/719,199

(22) Filed: May 21, 2015

(51) Int. Cl.
*H04B 1/00* (2006.01)
*H01Q 5/314* (2015.01)

(52) U.S. Cl.
CPC ............. *H04B 1/0053* (2013.01); *H01Q 5/314* (2015.01)

(58) Field of Classification Search
CPC .... H04B 1/0053; H04B 7/028; H04B 7/0456; H04B 7/0634; H04B 17/318
See application file for complete search history.

(56) References Cited

U.S. PATENT DOCUMENTS

| | | | | |
|---|---|---|---|---|
| 6,034,644 A * | 3/2000 | Okabe | ................... | H01Q 13/10 343/746 |
| 2007/0285326 A1* | 12/2007 | McKinzie | ............ | H01Q 9/0407 343/746 |
| 2008/0258981 A1* | 10/2008 | Achour | ................ | H01Q 21/065 343/702 |
| 2008/0280570 A1* | 11/2008 | Blin | ....................... | H03J 1/0008 455/77 |
| 2011/0175789 A1* | 7/2011 | Lee | ......................... | H01Q 1/243 343/853 |
| 2013/0154897 A1* | 6/2013 | Sorensen | ............... | H01Q 7/005 343/861 |
| 2015/0180593 A1* | 6/2015 | Hamilton | ............. | H04B 5/0043 455/107 |
| 2015/0326254 A1* | 11/2015 | Feldman | ................ | H04B 1/006 455/83 |
| 2015/0372656 A1* | 12/2015 | Mow | ........................ | H03H 7/38 455/77 |
| 2016/0056527 A1* | 2/2016 | Pascolini | ........... | G06K 9/00006 343/702 |

* cited by examiner

Primary Examiner — Andrew Wendell

(57) ABSTRACT

An electronic device including a tunable antenna, a radio frequency (RF) signal transceiving module, a coupler and a control unit, is provided. The RF signal transceiving module is coupled to the tunable antenna, transmits at least one RF signal through the tunable antenna. The coupler is coupled between the tunable antenna and the RF signal transceiving module, and couples the at least one RF signal to derive a coupling signal. The control unit receives the coupling signal and generates at least one control signal according to a signal strength of the RF signal in a specific frequency band, and outputs the at least one control signal to the tunable antenna so as to adjust a working frequency band of the tunable antenna.

11 Claims, 4 Drawing Sheets

US 9,425,831 B1

ELECTRONIC DEVICE

BACKGROUND

1. Technical Field

The invention relates to an electronic device having an antenna.

2. Related Art

Along with quick development of technology, mobile electronic devices such as smart phones and tablet personal computers (PCs) gradually become an indispensable part in daily life. The mobile electronic devices are generally capable of transceiving wireless radio frequency (RF) signals to satisfy user's requirements of making phone calls and transmitting data, and one or a plurality of antennas are required to be set on the mobile electronic devices according to a frequency band and characteristics of the RF signals to be transceived, so as to transceive the corresponding RF signals. Since the mobile electronic devices are designed towards a trend of lightness, slimness, shortness and smallness, a designer of the antennas generally use a single antenna to transceive the RF signals of a plurality of neighbouring frequency bands or even different frequency bands. Therefore, how to use the single antenna to transceive the RF signals of a plurality of neighbouring frequency bands or even different frequency bands while considering antenna efficiency for transceiving the RF signals of different frequency bands has become one of non-ignorable problems for the designer.

SUMMARY

The invention is directed to an electronic device, which is capable of adjusting a working frequency band of a tunable antenna according to a radio frequency (RF) signal transmitted by the tunable antenna in the electronic device.

The invention provides an electronic device including a tunable antenna, a radio frequency (RF) signal transceiving module, a coupler and a control unit. The RF signal transceiving module is coupled to the tunable antenna, and transmits at least one RF signal through the tunable antenna. The coupler is coupled between the tunable antenna and the RF signal transceiving module, and couples the at least one RF signal to derive a coupling signal. The control unit receives the coupling signal and generates at least one control signal according to a signal strength of the coupling signal in a specific frequency band, and outputs the at least one control signal to the tunable antenna to adjust a working frequency band of the tunable antenna.

According to the above descriptions, the invention provides an electronic device, which is capable of adjusting a working frequency band of a tunable antenna according to a signal strength of the coupling signal in a frequency band, where the signal strength of the coupling signal is proportional to the currently transmitted RF signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
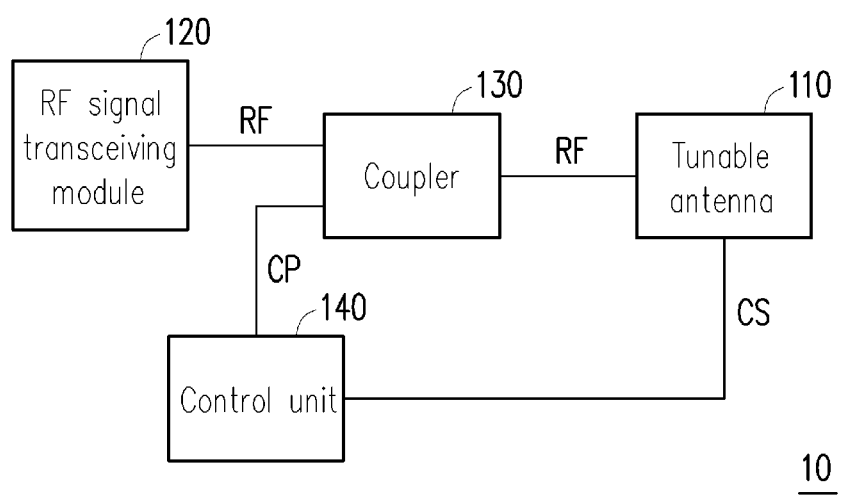
FIG. 1 is a functional block diagram of an electronic device according to an embodiment of the invention.

FIG. 1 is a functional block diagram of an electronic device according to an embodiment of the invention. Referring to FIG. 1, the electronic device 10 includes a tunable antenna 110, a radio frequency (RF) signal transceiving module 120, a coupler 130 and a control unit 140. The RF signal transceiving module 120 is coupled to the tunable antenna 110, and transmits at least one RF signal RF through the tunable antenna 110. The coupler 130 is coupled between the tunable antenna 110 and the RF signal transceiving module 120, and couples the at least one RF signal RF to derive a coupling signal CP. The control unit 140 receives the coupling signal CP and generates at least one control signal CS according to a signal strength of the coupling signal CP in a specific frequency band, and outputs the control signal CS to the tunable antenna 110 to adjust a working frequency band of the tunable antenna 110.

In brief, an antenna is generally designed for a specific frequency interval, for example, a length of an excitation path (i.e. a path from a feed-in terminal to an open terminal) of a planar inverted F antenna (PIFA) should be equal to or close to a quarter wavelength of an RF signal. If the other RF signal transceived by the PIFA has a center frequency different to the center frequency of the RF signal, an antenna gain thereof is gradually decreased along with deviation of the frequency, and when the deviation of the center frequency of the other RF signal is excessively large, the RF signal is more likely unable to be transceived through the PIFA antenna. Therefore, in the present embodiment, the tunable antenna 110 is capable of adjusting a capacitance to the ground (i.e. a capacitance between an antenna body and a system ground plane) according to the control signal CS during radiation of the antenna. In the present embodiment, the control unit 140 in the electronic device 10 can determine a frequency band of the RF signal RF according to the coupling signal CP received from the coupler 130, so as to determine whether to adjust the tunable antenna 110.

Figure 2:
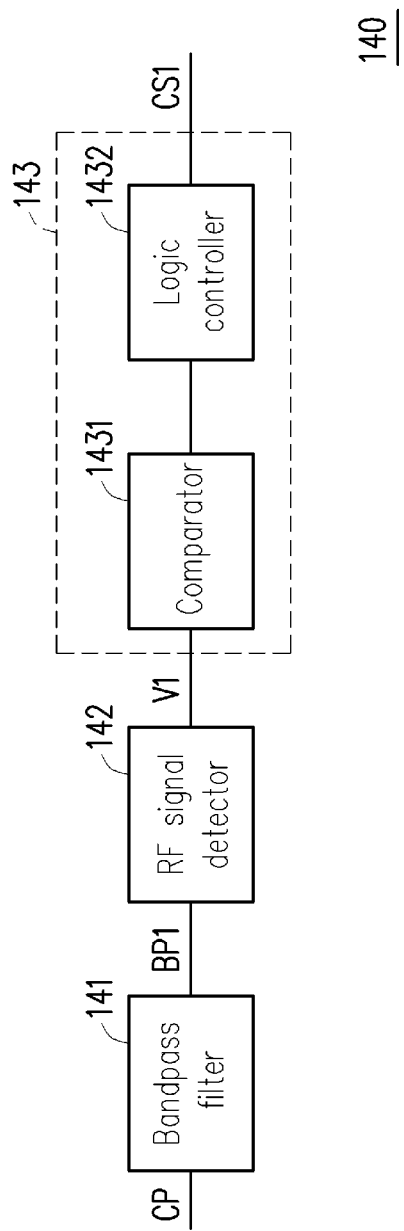
FIG. 2 is a functional block diagram of a control unit according to an embodiment of the invention.

FIG. 2 is a functional block diagram of the control unit according to an embodiment of the invention. Referring to FIG. 2, the control unit 140 includes a bandpass filter 141, an RF signal detector 142 and an output unit 143. The output unit 143 further includes a comparator 1431 and a logic controller 1432. The bandpass filter 141 is connected to the coupler 130. When the bandpass filter 141 receives the coupling signal CP from the coupler 130 corresponding to a specific frequency band (for example, a first frequency band), the bandpass filter 141 filters the coupling signal CP to obtain a bandpass signal BP1. The RF signal detector 142 is coupled to the bandpass filter 141, and outputs a voltage V1 according to a signal strength of the bandpass signal BP1. The output unit 143 is coupled to the RF signal detector 142, and receives the voltage V1 from the RF signal detector 142 and outputs at least a first control signal CS1 of the control signal CS according to the voltage V1, wherein the first control signal CS1 has a first logic level and a second logic level. In the present embodiment, the first logic level and the second logic level can be respectively a high voltage level representing a Boolean value of 1 and a low voltage level representing the Boolean value of 0, though the invention is not limited thereto.

In the present embodiment, the output unit 143 further includes the comparator 1431 and the logic controller 1432. The comparator 1431 is coupled to the RF signal detector 142. When the comparator 1431 receives the voltage V1, the comparator 1431 compares a voltage value of the voltage V1 with a predetermined voltage value. When the voltage value of the voltage V1 is greater than the predetermined voltage value, the comparator 1431 controls the logic controller 1432 to output the first control signal CS1 with the first logic level to the tunable antenna 110.

For example, when a signal strength of the bandpass signal BP in the first frequency band is higher than a threshold (for example, the signal strength approaches an emitting strength of the RF signal RF), the voltage value of the voltage V1 is greater than the predetermined voltage value. When the voltage value of the voltage V1 is greater than the predetermined voltage value, the comparator 1431 controls the logic controller 1432 to output the first control signal CS1 with the first logic level (for example, the high voltage level) to the tunable antenna 110. When the signal strength of the bandpass signal BP in the first frequency band is lower than the threshold, the voltage value of the voltage V1 is smaller than the predetermined voltage value. When the voltage value of the voltage V1 is smaller than the predetermined voltage value, the comparator 1431 controls the logic controller 1432 to output the first control signal CS1 with the second logic level (for example, the low voltage level) to the tunable antenna 110.

In brief, in the present embodiment, the tunable antenna 110 may include two configurations respectively corresponding to two frequency bands with different center frequencies, for example, 700 MHz and 850 MHz. The frequency band of the bandpass filter 141 can be set to 700 MHz or 850 MHz, and in the present embodiment, the center frequency of the frequency band corresponding to the bandpass filter 141 is set to 700 MHz. When the center frequency of the RF signal RF is close to 700 MHz, and the coupling signal CP passes through the bandpass filter 141, the signal strength thereof is not largely attenuated due to a filtering effect of the bandpass filter 141, and the signal strength of the bandpass signal BP1 is close to the signal strength of the RF signal RF itself. Now, the RF signal detector 142 can output the voltage V1 reflecting the signal strength, and the output unit 143 outputs the first control signal CS1 with the first logic level (for example, the high voltage level) in response to the voltage V1.

On the other hand, in the same case that the center frequency of the frequency band corresponding to the bandpass filter 141 is 700 MHz, if the center frequency of the RF signal RF is close to 850 MHz, most of the signal components of the signal strength thereof are filtered due to the filtering effect of the bandpass filter 141 when the coupling signal CP passes through the bandpass filter 141. Therefore, the signal strength of the bandpass signal BP1 is far less than the signal strength of the RF signal RF itself. At this time, the RF signal detector 142 can output the voltage V1 reflecting the signal strength, and the output unit 143 outputs the first control signal CS1 with another logic level in response to the voltage V1, for example, the first control signal CS1 with the second logic level (for example, the low voltage level).

The first logic level and the second logic level can directly correspond to the configurations of the tunable antenna 110 corresponding to the 700 MHz and 850 MHz. When the tunable antenna 110 receives the first control signal CS1 with the first logic level, the tunable antenna 110 can be set to the configuration corresponding to the 700 MHz, and when the tunable antenna 110 receives the second control signal CS2 with the second logic level, the tunable antenna 110 can be set to the configuration corresponding to the 850 MHz. In the present embodiment, a setter of the electronic device 10 can set the most commonly used frequency band in the two configurations as predetermined configuration. For example, the 700 MHz and 850 MHz respectively correspond to frequency bands used by a long term evolution (LTE) standard in a fourth-generation (4G) mobile communication standard and a CDMA2000 standard in a 3G mobile communication standard. The setter of the electronic device 10 can set the configuration corresponding to the 700 MHz as the predetermined configuration according to a user's habit When the tunable antenna 110 receives the first control signal CS1 with the second logic level corresponding to the configuration of the 850 MHz, the tunable antenna 110 is switched to the configuration corresponding to the 850 MHz, though the invention is not limited thereto.

Figure 3:
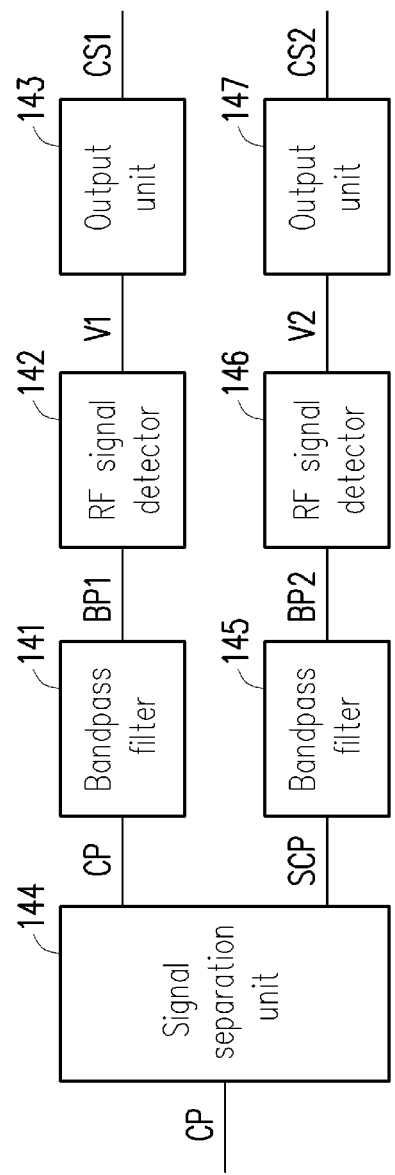
FIG. 3 is a functional block diagram of the control unit according to an embodiment of the invention.

FIG. 3 is a functional block diagram of the control unit according to an embodiment of the invention. In the embodiment of FIG. 3, the tunable antenna 110 connected to the control unit 140 has four configurations corresponding to four frequency bands, in which two low frequency bands are included. For example, two relatively low frequency bands with the center frequencies of 700 MHz and 850 MHz mentioned in the embodiment of FIG. 2 (i.e. one of which is the first frequency band), and two relatively high frequency bands, for example, 1700 MHz and 1900 MHz (i.e. one of which is a second frequency band) are the four frequency bands mentioned above. The frequency bands with the center frequencies of 1700 MHz and 1900 MHz respectively correspond to frequency bands used by the LTE standard in the 4G mobile communication standard and the 3G mobile communication standard. Referring to FIG. 3, besides including the bandpass filter 141, the RF signal detector 142 and the output unit 143, the control unit 140 further includes a signal splitting unit 144, a bandpass filter 145, an RF signal detector 146 and an output unit 147. The signal splitting unit 144 is coupled between the coupler 130 and the bandpass filters 141 and 145, and receives the coupling signal CP and splits the coupling signal CP to obtain a sub coupling signal SCP. For example, the signal splitting unit 144 transmits the coupling signal CP to the bandpass filter 141, and transmits the sub coupling signal SCP to the bandpass filter 145. In the present embodiment, the signal splitting unit 144 can be a coupler or a power divider. Regardless of using the coupler or the power divider to implement the signal splitting unit 144, the signal strengths of the coupling signal CP and the sub coupling signal SCP are probably attenuated due to functions of devices in the signal splitting unit 144, but are still positively correlated with the signal strength of the RF signal RF.

For example, in case that the signal splitting unit 144 is implemented by the coupler, the coupling signal CP and the sub coupling signal SCP with a higher center frequency (for example, the aforementioned frequency band, 1700 MHz or 1900 MHz) may have a signal attenuation of about 1 dB (or less), and the coupling signal CP and the sub coupling signal SCP with a lower center frequency (for example, the aforementioned frequency band of 700 MHz or 850 MHz) probably have a signal attenuation of 10 dB or more. In case that the signal splitting unit 144 is implemented by the power divider, regardless of whether the center frequency is in a higher frequency band or a lower frequency band, the signal attenuation of about 3 dB is probably occurred. However, since the signal attenuation of the signal splitting unit 144 is deducible and not greater than the signal attenuation caused by the filtering effect of the bandpass filters 141 and 145, the signal attenuation of the signal splitting unit 144 does not influence the operations of the control unit 140.

The operations of the bandpass filter 141, the RF signal detector 142 and the output unit 143 may refer to the embodiment of FIG. 2, and details thereof are not repeated. The bandpass filter 145 can be set corresponding to a higher frequency band, for example, one of the frequency band of 1700 MHz or 1900 MHz. The bandpass filter 145 is connected to the signal splitting unit 144 and receives the sub coupling signal SCP, and filters the sub coupling signal SCP to obtain a bandpass signal BP2. Wherein the bandpass filter 145 corresponds to the second frequency band, for example, the frequency band of 1700 MHz or 1900 MHz, wherein the first frequency band and the second frequency band are not overlapped (i.e. the second frequency band is not overlapped with the frequency band corresponding to the bandpass filter 141).

The RF signal detector 146 is coupled to the bandpass filter 145, and outputs a voltage V2 according to a signal strength of the bandpass signal BP2. The output unit 147 is coupled to the RF signal detector 146, and outputs at least the second control signal CS2 in the control signal according to the voltage V2. Wherein the second control signal CS2 has the first logic level and the second logic level, and similar to the first control signal CS1. The first logic level and the second logic level can be respectively a high voltage level representing the Boolean value of 1 and a low voltage level representing the Boolean value of 0.

The center frequency of the frequency band corresponding to the bandpass filter 145 is set to 1700 MHz. When the center frequency of the RF signal RF is 1700 MHz and the sub coupling signal SCP passes through the bandpass filter 145, the signal strength thereof is not largely attenuated due to the filtering effect of the bandpass filter 145 and the signal strength of the bandpass signal BP2 is close to the signal strength of the RF signal RF (the signal strength of the RF signal RF itself minus the signal attenuation caused by the signal splitting unit 144). Now, the RF signal detector 146 can output the voltage V2 reflecting the signal strength, and the output unit 147 outputs the second control signal CS2 with the first logic level (for example, the high voltage level) in response to the voltage V2.

On the other hand, in the same case that the center frequency of the frequency band corresponding to the bandpass filter 145 is 1700 MHz. If the center frequency of the RF signal RF is close to 1900 MHz and the sub coupling signal SCP passes through the bandpass filter 145, most of the signal components of the signal strength thereof are filtered due to the filtering effect of the bandpass filter 145. So that the signal strength of the bandpass signal BP2 is far less than the signal strength of the RF signal RF. Now, the RF signal detector 146 can output the voltage V2 reflecting the signal strength of the bandpass signal BP2, and the output unit 147 outputs the second control signal CS2 with another logic level in response to the voltage V2, for example, the second control signal CS2 with the second logic level (for example, the low voltage level).

The first logic level and the second logic level can directly correspond to the configurations of the tunable antenna 110 corresponding to the 1700 MHz and 1900 MHz respectively. When the tunable antenna 110 receives the second control signal CS2 with the first logic level, the tunable antenna 110 can be set to the configuration corresponding to the 1700 MHz. When the tunable antenna 110 receives the second control signal CS2 with the second logic level, the tunable antenna 110 can be set to the configuration corresponding to the 1900 MHz. In the present embodiment, the setter of the electronic device 10 can set the most commonly used frequency band in the two configurations as predetermined configuration, though the invention is not limited thereto.

Figure 4:
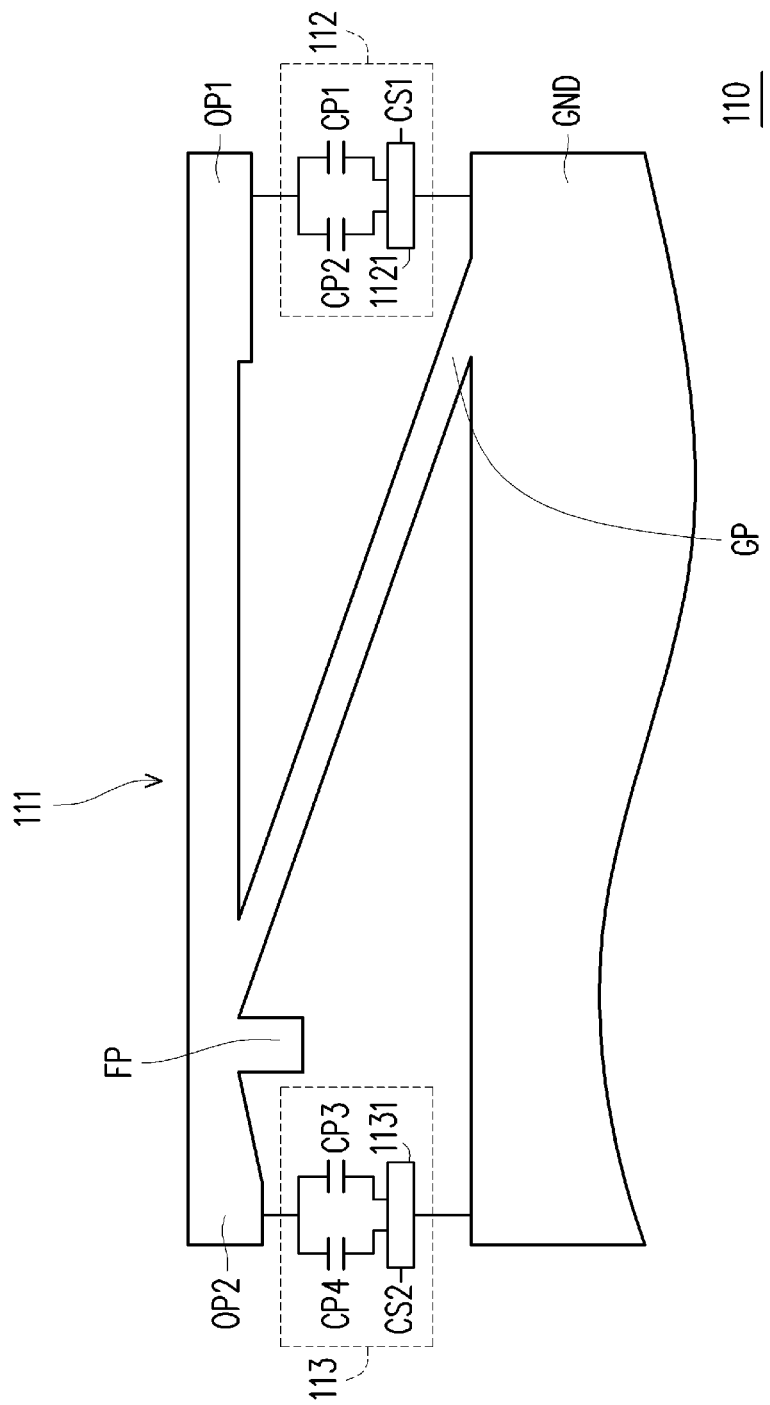
FIG. 4 is a structural schematic diagram of a tunable antenna according to an embodiment of the invention.

FIG. 4 is a structural schematic diagram of the tunable antenna according to an embodiment of the invention. Referring to FIG. 4, in the present embodiment, the tunable antenna 110 includes an antenna body 111, a first capacitor set 112 and a second capacitor set 113. The antenna body 111 includes a feed-in terminal FP, a ground terminal GP, a first open terminal OP1 and a second open terminal OP2. The antenna body 111 transceives a first RF signal of at least one RF signal through a first path between the feed-in terminal FP and the first open terminal OP1. The antenna body 111 transceives a second RF signal in the at least one RF signal through a second path between the second open terminal OP2 and the feed-in terminal FP. According to FIG. 4, it is known that a path length of the first path is longer than a path length of the second path, so that the first RF signal corresponds to the RF signal with a lower center frequency (for example, the center frequency is at the frequency band of 700 MHz or 850 MHz), and the second RF signal corresponds to the RF signal with a higher center frequency (for example, the center frequency is at the frequency band of 1700 MHz or 1900 MHz).

The first capacitor set 112 is coupled between the first open terminal OP1 of the antenna body 111 and a system ground plane GND, and a control terminal of the first capacitor set 112 is coupled to the control unit 140 and receives the first control signal CS1 from the control unit 140. The first capacitor set 112 includes a switch 1121 coupled to the control terminal of the first capacitor set 112 and a first capacitor CP1 and a second capacitor CP2 coupled between the first open terminal OP1 and the switch 1121. When the first control signal CS1 received by the first capacitor set 112 from the control unit 140 has the first logic level, the first capacitor set 112 (in detail, the switch 1121 in the first capacitor set 112) conducts a path between the first open terminal OP1 and the system ground plane GND via the first capacitor CP1. When the first control signal CS1 received by the first capacitor set 112 from the control unit 140 has the second logic level, the first capacitor set 112 conducts a path between the first open terminal OP1 and the system ground plane GND via the second capacitor CP2.

The second capacitor set 113 is coupled between the second open terminal OP2 of the antenna body 111 and the system ground plane GND, and a control terminal of the second capacitor set 113 is coupled to the control unit 140 and receives the second control signal CS2 from the control unit 140. The second capacitor set 113 includes a switch 1131 coupled to the control terminal of the second capacitor set 113 and a third capacitor CP3 and a fourth capacitor CP4 coupled between the second open terminal OP2 and the switch 1131. When the second control signal CS2 received by the second capacitor set 113 from the control unit 140 has the first logic level, the second capacitor set 113 (in detail, the switch 1131 in the second capacitor set 113) conducts a path between system ground plane GND and the second open terminal OP2 via the third capacitor CP3. When the second control signal CS2 received by the second capacitor set 113 from the control unit 140 has the second logic level, the second capacitor set 113 conducts a path between the system ground plane GND and the second open terminal OP2 via the fourth capacitor CP4

The antenna body 111 transceives the RF signal RF according to a planar inverted F antenna (PIFA) principle. Generally, according to the PIFA principle, the path lengths of the first path and the second path of the antenna body 111 are respectively equivalent to or close to a quarter wavelength of the first RF signal and the second RF signal transceived by the antenna body 110. However, in the present embodiment, since the first capacitor set 112 and the second capacitor set 113 respectively coupled between the first open terminal OP1, the second open terminal OP2 and the system ground plane GND are added in the tunable antenna 110. A capacitance effect between the first path or the second path in the antenna body 111 and the system ground plane GND is changed particularly when the antenna body 111 is excited when transceiving the first RF signal or the second RF signal, such that a working frequency of the antenna body 111 transceiving the first RF signal or the second RF signal is decreased.

Therefore, the path length of the first path is smaller than the quarter wavelength of the first RF signal, the path length of the second path is smaller than the quarter wavelength of the second RF signal, and a center frequency of the second RF signal is higher than a center frequency of the first RF signal.

In the present embodiment, the first capacitor CP1 and the second capacitor CP2 in the first capacitor set 112 and the third capacitor CP3 and the fourth capacitor CP4 in the second capacitor set 113 respectively correspond to configurations of the RF signal RF with different center frequencies that are transceiver by the tunable antenna 110. For example, the first capacitor CP1 and the second capacitor CP2 respectively correspond to the RF signal RF (i.e. the first RF signal) having the center frequency at the frequency band of 700 MHz or 850 MHz, and the third capacitor CP3 and the fourth capacitor CP4 respectively correspond to the RF signal RF (i.e. the second RF signal) having the center frequency at the frequency band of 1700 MHz or 1900 MHz. Capacitances of the first capacitor CP1 and the second capacitor CP2 in the first capacitor set 112 and the third capacitor CP3 and the fourth capacitor CP4 in the second capacitor set 113 are different along with difference of the first path, the second path and the center frequencies of the corresponding RF signals. In principally, the capacitances of the first capacitor CP1 and the second capacitor CP2 in the first capacitor set 112 and the third capacitor CP3 and the fourth capacitor CP4 in the second capacitor set 113 are all smaller than 1 pF, though the invention is not limited thereto.

By sending the first control signal CS1 and the second control signal CS2 to the tunable antenna 110 through the control unit 140, the electronic device 10 can automatically and adaptively adjust the configuration of the tunable antenna 110, so as to cope with the frequency band of the RF signal to be transmitted. In the aforementioned embodiment, the tunable antenna 110 includes four configurations (where two of the configurations correspond to two higher frequency bands, and the other two of the configurations correspond to two lower frequency bands), though the invention is not limited thereto. The setter of the electronic device 10 can increase or decrease the number of the configurations of the tunable antenna 110 and adjust the components in the control unit 140 according to an actual requirement. In the other embodiments of the invention, the tunable antenna 110 may have other patterns. For example, the tunable antenna 110 includes an antenna body and an impedance matching unit. When the impedance matching unit receives at least one control signal (for example, the aforementioned first control signal CS1 and the second control signal CS2), an impedance matching value in the impedance matching unit can be adjusted according to the control signal, such that the impedance matching value is adjusted according to the frequency band of the currently transmitted RF signal, and an antenna gain of the tunable antenna 110 is maintained stable.

In summary, the invention provides an electronic device including a tunable antenna and a control unit, the electronic device 10 is capable of automatically and adaptively adjust the configurations of the tunable antenna 110, so as to cope with the frequency band of the RF signal to be transmitted, such a good emitting efficiency and good antenna gain of the tunable antenna 110 can be maintained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An electronic device, comprising:
a tunable antenna;
a radio frequency signal transceiving module, coupled to the tunable antenna, and transmitting at least one radio frequency signal through the tunable antenna;
a coupler, coupled between the tunable antenna and the radio frequency signal transceiving module, and coupling the at least one radio frequency signal to derive a coupling signal; and
a control unit, receiving the coupling signal, and generating at least one control signal according to a signal strength of the coupling signal in a specific frequency band, and outputting the control signal to the tunable antenna to adjust a working frequency band of the tunable antenna;
wherein the tunable antenna comprises:
an antenna body, comprising a feed-in terminal, a ground terminal, a first open terminal, and a second open terminal;
a first capacitor set, coupled between the first open terminal of the antenna body and a system ground plane, a control terminal of the first capacitor set being coupled to the control unit, and comprising a first capacitor and a second capacitor coupled to the system ground plane; and
a second capacitor set, coupled between the second open terminal of the antenna body and a system ground plane, a control terminal of the second capacitor set being coupled to the control unit, and comprising a third capacitor and a fourth capacitor coupled to the system ground plane;
wherein capacitances of the first capacitor and the second capacitor in the first capacitor set, and capacitances of the third capacitor and the fourth capacitor in the second capacitor set are smaller than 1 pF;
wherein the antenna body transceives a first radio frequency signal in the at least one radio frequency signal through a first path between the feed-in terminal and the first open terminal;
wherein the antenna body further transceives a second radio frequency signal in the at least one radio frequency signal through a second path between the feed-in terminal and the second open terminal; and
wherein a path length of the first path is longer than a path length of the second path, such that such that the tunable antenna is automatically adjusted to different frequencies in accordance with the coupling signal received from the coupler.

2. The electronic device as claimed in claim 1, wherein the specific frequency band comprises a first frequency band, and the control unit comprises:

a first bandpass filter, connected to the coupler, and filtering the coupling signal to obtain a first bandpass signal, wherein the bandpass filter corresponds to the first frequency band;

a first radio frequency signal detector, coupled to the first bandpass filter, and outputting a first voltage according to the signal strength of the first bandpass signal; and a first output unit, coupled to the first radio frequency signal detector, and outputting a first control signal in the at least one control signal according to the first voltage, wherein the first control signal has a first logic level and a second logic level.

3. The electronic device as claimed in claim 2, wherein the first output unit comprises:
a logic controller, coupled to the tunable antenna, and outputting the first control signal to the tunable antenna; and
a comparator, coupled between the first radio frequency signal detector and the logic controller, and comparing a voltage value of the first voltage with a predetermined voltage value, wherein when the voltage value of the first voltage is greater than the predetermined voltage value, the comparator controls the logic controller to output the first control signal with the first logic level to the tunable antenna.

4. The electronic device as claimed in claim 3, wherein
when the signal strength of the first bandpass signal in the first frequency band is higher than a first threshold, the voltage value of the first voltage is greater than the predetermined voltage value;
when the signal strength of the first bandpass signal in the first frequency band is lower than the first threshold, the voltage value of the first voltage is smaller than the predetermined voltage value; and
when the voltage value of the first voltage is smaller than the predetermined voltage value, the comparator controls the logic controller to output the first control signal with the second logic level to the tunable antenna.

5. The electronic device as claimed in claim 2, wherein the specific frequency band further comprises a second frequency band that is not overlapped with the first frequency band, and the control unit comprises:
a signal splitting unit, coupled between the coupler and the first bandpass filter, and receiving the coupling signal and splitting the coupling signal to obtain a sub coupling signal;
a second bandpass filter, connected to the signal splitting unit and receiving the sub coupling signal, and filtering the sub coupling signal to obtain a second bandpass signal, wherein the bandpass filter corresponds to the second frequency band;
a second radio frequency signal detector, coupled to the second bandpass filter, and outputting a second voltage according to a signal strength of the second bandpass signal; and
a second output unit, coupled to the second radio frequency signal detector, and outputting a second control signal in the at least one control signal according to the second voltage, wherein the second control signal has the first logic level and the second logic level.

6. The electronic device as claimed in claim 5, wherein the second output unit comprises:
a logic controller, coupled to the tunable antenna, and outputting the second control signal to the tunable antenna; and
a comparator, coupled between the second radio frequency signal detector and the logic controller, and comparing a voltage value of the second voltage with a predetermined voltage value, wherein when the voltage value of the second voltage is greater than the predetermined voltage value, the comparator controls the logic controller to output the second control signal with the first logic level to the tunable antenna.

7. The electronic device as claimed in claim 6, wherein
when the signal strength of the second bandpass signal in the second frequency band is higher than a second threshold, the voltage value of the second voltage is greater than the predetermined voltage value;
when the signal strength of the second bandpass signal in the second frequency band is lower than the second threshold, the voltage value of the second voltage is smaller than the predetermined voltage value; and
when the voltage value of the second voltage is smaller than the predetermined voltage value, the comparator controls the logic controller to output the second control signal with the second logic level to the tunable antenna.

8. The electronic device as claimed in claim 5, wherein the signal splitting unit can be a coupler or a power divider.

9. The electronic device as claimed in claim 1,
wherein a path length of the first path is smaller than a quarter wavelength of the first radio frequency signal,
wherein when a first control signal in the at least one control signal received by the first capacitor set from the control unit has a first logic level, the first capacitor set conducts a path between the first capacitor and the first open terminal, and
when the first control signal received by the first capacitor set from the control unit has a second logic level, the first capacitor set conducts a path between the second capacitor and the first open terminal.

10. The electronic device as claimed in claim 9,
wherein a path length of the second path is smaller than a quarter wavelength of the second radio frequency signal, and a center frequency of the second radio frequency signal is higher than a center frequency of the first radio frequency signal.

11. The electronic device as claimed in claim 10,
wherein when a second control signal in the at least one control signal received by the second capacitor set from the control unit has the first logic level, the second capacitor set conducts a path between the third capacitor and the second open terminal,
when the second control signal received by the second capacitor set from the control unit has the second logic level, the second capacitor set conducts a path between the fourth capacitor and the second open terminal.

* * * * *